Oct. 24, 1944.　　　G. J. PIEROTTI ET AL　　　2,360,861
SOLVENT EXTRACTION PROCESS
Filed Feb. 8, 1943
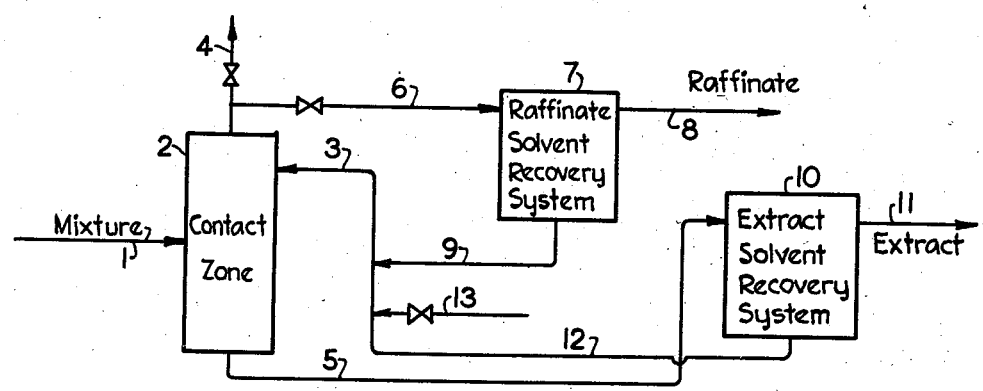
Fig. I
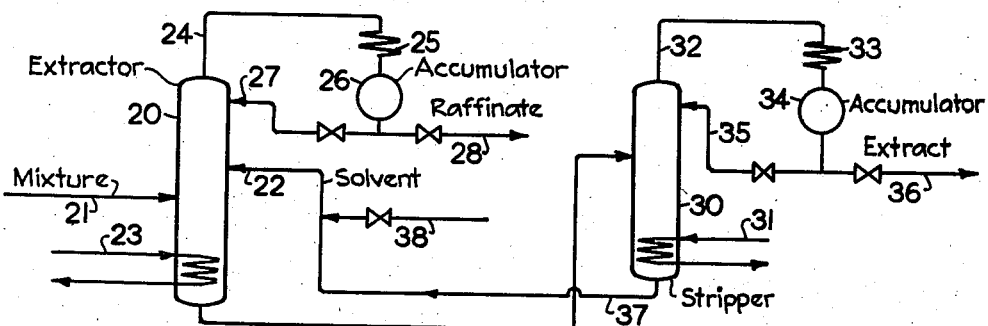
Fig. II
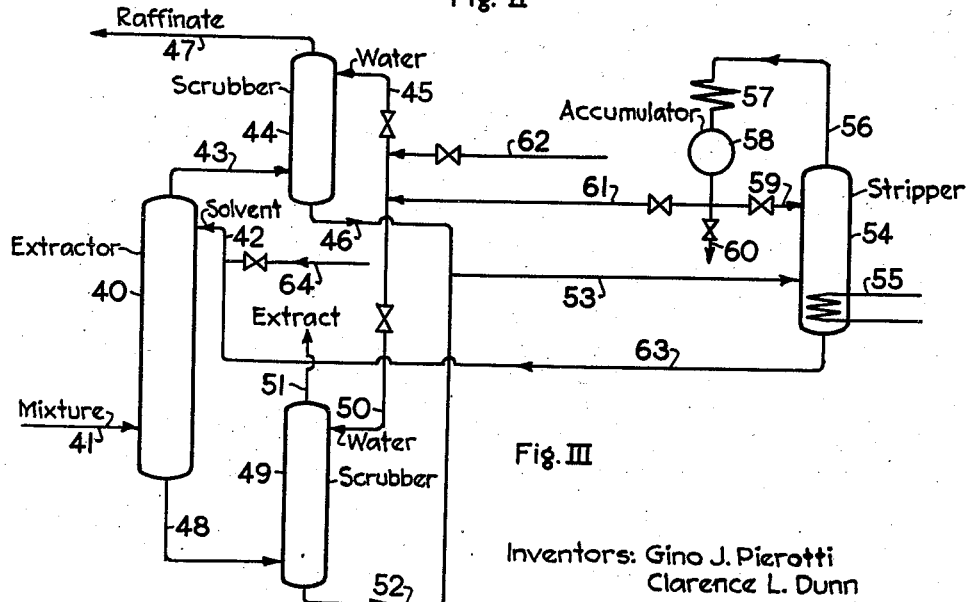
Fig. III
Inventors: Gino J. Pierotti
Clarence L. Dunn
By their Attorney:

Patented Oct. 24, 1944

2,360,861

UNITED STATES PATENT OFFICE 2,360,861

SOLVENT EXTRACTION PROCESS

Gino J. Pierotti, Albany, and Clarence L. Dunn, Berkeley, Calif., assignors to Shell Development Company, San Francisco, Calif., a corporation of Delaware Application February 8, 1943, Serial No. 475,212

25 Claims. (Cl. 196—13)

This invention relates to a process for separating mixtures of different compounds by extraction with a selective solvent which comprises a hydrocarbon-substituted sulfolane wherein the hydrocarbon radical or radicals contain from one to ten carbon atoms. Hydrocarbon-substituted sulfolanes are derivatives of sulfolane

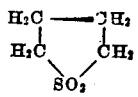

wherein one or more of the hydrogen atoms is replaced by a hydrocarbon radical, preferably an alkyl radical. These sulfolanes may be made by condensing conjugated diolefins and sulfur dioxide, and then hydrogenating the resulting product to produce the corresponding sulfolane.

It is the broad purpose of this invention to separate mixtures of different compounds economically, efficiently and effectively by solvent extraction. Specific purposes are, among others, to produce pure compounds, desulfurize and increase the viscosity index of hydrocarbon mixtures, dehydrate wet compounds, separate components of constant boiling mixtures or of mixtures having boiling points closer than, say, 10° C., or of isomeric mixtures, or mixtures of similar organic compounds having different degrees of saturation, or of other mixtures otherwise difficultly separable.

Generally the process of this invention comprises the steps of (A) contacting the mixture to be separated either in the liquid or the vapor state with a liquid selective solvent to produce a raffinate phase and an extract phase, (B) separating the two phases from each other, and (C) removing said solvent from at least one of said phases to produce a raffinate and/or an extract, and usually also recovering the solvent removed for further contact with more of said mixture. These steps, common to all solvent extraction processes, both liquid-liquid and vapor-liquid (including extractive distillation), may be carried out in any suitable manner known to those skilled in the art.

Many different types of mixtures of compounds may be separated by the selective solvents of this invention, provided the mixtures are inert toward the solvent, and the presence of the solvent in the mixture causes a greater change in the "escaping tendency" of one component of the mixture relative to that of other components. By "escaping tendency" is meant the potential of one component to pass from one phase to another. Thus the selective solvents of this invention are effective for the isolation of pure compounds, the separation of isomers, various purification processes such as desulfurization and dehydration, the separation of mixtures forming azeotropes, or the separation of mixtures of organic compounds of different degrees of saturation, for instance to concentrate different types of hydrocarbons in different fractions, examples being the separation of aromatics, polyolefins, olefins, naphthenes, and paraffins from various hydrocarbon mixtures containing them.

Some specific examples of mixtures which may be separated by the selective solvents of this invention are hydrocarbon mixtures such as ethane and ethylene; propane and propylene; butane, isobutane, alpha-, beta-, and iso-butylenes, butadiene; pentanes, pentenes, isoprene and piperylene; hexanes and hexenes; gasoline distillates containing benzene, toluene, xylenes, ethyl benzene, mesitylene, cumene, etc.; ortho and paraxylene; naphthenes and paraffins; gasoline, kerosene, fuel oils, lubricating oils, etc.; chlorinated hydrocarbons including ortho and parachloronitrobenzene; etc. Other mixtures which may be separated are those of organic substances containing water, such as aqueous alcohols including methyl, ethyl, propyl, etc. alcohols; glycols; glycerines; chlorohydrins; organic acids including acetic, propionic, lactic, etc. acids; esters including isopropyl acetate; etc. Still other mixtures are those of oxy organic compounds such as ortho and para nitrophenol; ortho and para methoxy phenol; ortho and para dihydroxy benzene; glycol chlorhydrin and glycol; glycol and glycol ethers; ethyl acetate and ethyl alcohol; nitroglycerine and glycerine; primary and secondary butyl alcohols; alkyl phenols such as ortho, meta and para cresols; ortho and para hydroxy benzaldehyde; ortho and para ethoxy aniline; ortho and para vanillin; methyl propyl ketone and diethyl ketone; mixtures of resorcin, pyrocatechine and hydroquinone; terpenes or sesquiterpenes from oxygen-containing compounds such as alcohols or aldehydes present therein; etc. Other organic mixtures are those produced in various chemical industrial processes of the coal, lignite and petroleum industries such as organic sulfur compounds, including mercaptans, mixtures of phenols and thiophenols; essential oils; fatty oils including glyceride oils, such as linseed, soya bean, fish, perilla, cottonseed, etc.; mono-, di- and trimethylamines; isoprene and methyl formate; isophorone and xylidine; isophorone and xylenol; organic acids such as methyl succinic acid and glutaric acid; various fatty acids including stearic, oleic, linoleic, etc. acids; rosin and certain resins; propane-1,1-dicarboxylic acid and propane-1,3-dicarboxylic acid; ortho and para cetyl benzol sulfonic acid; etc.

It may be noted that all the above mixtures are of a type which are at least partially soluble in the commonly known selective solvents which have preferential solvent power for aromatic over paraffinic hydrocarbons.

The hydrocarbon-substituted sulfolanes of this invention may be employed as selective solvents by themselves singly or as mixtures of two or more, or in aqueous solutions, together with other commonly known selective solvents or anti-solvents. Some suitable specific hydrocarbon-substituted sulfolanes are: 2-methyl, 3-methyl, ethyl, 2,5-dimethyl, 2,4-dimethyl, 2-3-dimethyl, 2-2-dimethyl, 3-4-dimethyl, 3-ethyl, 2-propyl, 2-methyl-5-ethyl, 2-isopropyl, 2-ethyl-3-methyl, 2-methyl-2-ethyl, 2,2,5-trimethyl, 2,3,5-trimethyl, 3,4,5-trimethyl, 2,2,4-trimethyl, 2-methyl-3-ethyl, 3-ispropyl, 2-methyl-5-propyl, 2,5-dimethyl, 2-propyl-4-methyl, 2,3-dimethyl-5-ethyl, 2,4-dimethyl-5-ethyl, 2-methyl-5-isopropyl, 3-methyl-5-isopropyl, 2,3,4,5-tetramethyl, 2,2,4,5-tetramethyl, 2,2,5,5-tetramethyl, 2,2-dimethyl-4-ethyl, 3-butyl, 2,3-dimethyl-5-propyl, 2-methyl-5-isobutyl, 2,5-diethyl-3-methyl, 2-isobutyl-4-methyl, 2,2-dimethyl-5-isopropyl, 2,3-dimethyl-5-isopropyl, 3-ethyl-2-propyl, 2,5-dimethyl-5-ethyl, 2-tertiary butyl-4-methyl, 2-hexyl, 2-ethyl-3-methyl-5-propyl, 2,3-dimethyl-5-butyl, 2-methyl-4-ethyl-5-propyl, 2-isopentyl-3-methyl, 2,2-dimethyl-5-isobutyl, 2,3-dimethyl-5-isobutyl, 2-isopropyl-4-methyl-5-ethyl, 2,5-dimethyl-2-5-diethyl, 2,5-dimethyl-3-4-diethyl, 3-methyl-5-hexyl, 2-methyl-2-hexyl, 2,5-dipropyl-3-methyl, 2-isopropyl-3-methyl-5-propyl, 2-ethyl-3-methyl-5-isobutyl, 2,5-diisopropyl-3-methyl, 2,2,4-trimethyl-5-isobutyl, 3-heptyl, 3,4-ditertiary butyl, etc.; 2-phenyl, 3-phenyl, 2-phenyl-5-methyl, 3-phenyl-5-methyl, 2-phenyl-5-ethyl, 2-phenyl-3-4-dimethyl, 2-phenyl-5-propyl, etc. sulfolanes.

While the sulfolane may contain from 5 to 14 carbon atoms, it is in general preferred that the total number of carbon atoms in the hydrocarbon radicals attached to the sulfolane ring range from 1 to 4, i. e. the sulfolanes contain 5 to 8 carbon atoms.

The above sulfolanes have the advantage as against many of the now commercially employed solvents such as liquid $SO_2$, furfural, phenol, nitrobenzene, aniline, etc., of relatively high thermal stability, and chemical inertness. For example, liquid $SO_2$, phenol and others will react with diolefins. Aniline will react with acids. Nitrobenzene will react with mercaptans. Furfural will polymerize and/or decompose in the presence of mere traces of acids or bases. In contrast, the sulfolanes are unreactive in all of the above cases.

Some commonly known solvents, selective solvents and/or modifying agents which may be employed in conjunction with the sulfolanes include: water, various mono and polyhydric alcohols such as methanol, ethanol, propanol, furfuryl alcohol, benzyl alcohol, glycols, glycerols, etc.; various ketones such as acetone, methyl ethyl ketone, acetonyl acetone, diethyl ketone, cyclopentanone, benzophenone, phenyl tolyl ketone, diphenylene ketone, etc.; various aldehydes such as crotonaldehyde, acrolein, furfural, etc.; ethers such as ethylene glycol and diethylene glycol mono-alkyl ethers, mono- and diglyceryl ethers, glyceryl diethers, chlorinated dialkyl ethers (e. g. beta-beta-dichlorethyl ether), dioxane, etc.; lower aliphatic acids such as formic, acetic, propionic acids, acetic anhydride, etc.; esters such as benzoic, phthalic acid esters, etc.; phenol, cresylic acids, alkyl phenol mixtures, naphthols, alkyl naphthols, etc.; liquid ammonia, various organic amines such as lower aliphatic primary amines having 1 to 8 carbon atoms, aniline, alkyl anilines, morpholine, diphenyl amine, ditolyl amine, etc.; various nitriles such as acetonitrile, propionitrile, lactonitrile, butyronitrile, benzonitrile, etc.; various nitro hydrocarbons such as nitromethane, nitroethane, nitrobenzene, nitrotoluene, nitroxylenes, etc.; various pyridines and quinolines; liquid sulfur dioxide; various aromatic hydrocarbons such as benzene, toluene, naphthalene, etc.; various modifying salts such as those disclosed in U. S. Patent 2,246,257 to Kohn; and the like.

Furthermore, anti-solvents may be employed together with the selective solvents of this invention such as are employed in the Duo-Sol process for the extraction of aromatics from lubricating oils. Some such anti-solvents include propane, butane, pentane, hexane, gasoline, benzene, kerosene, gas oil, lubricating oil, various ethers, trichlorethylene, carbon tetrachloride, etc. Still further, compounds of two or more solvents together with one or more anti-solvents may also be employed.

The amount of these additives which may be employed in conjunction with the hydrocarbon-substituted sulfolanes of this invention to make up the solvent may vary between 0% and 90% by volume, and preferably less than 50% by volume, of the solvent.

The nature of the mixture to be separated usually determines whether a vapor-liquid or liquid-liquid process should be employed. Mixtures having high viscosities and high boiling points, or mixtures chemically or physically unstable at high temperatures, or mixtures which react with the solvent at high temperatures, are preferably extracted while in the liquid state. In liquid-liquid solvent extraction processes the temperature generally may range within wide limits, provided it is above the melting temperature of the solvent and below the boiling temperature of both the mixture and the solvent under the pressure conditions of operation of the process. For example, if a very volatile mixture is being separated, a relatively high pressure and/or low temperature are required, while if a very viscous and high boiling mixture is being separated, higher temperature and lower pressure are normally more advantageous. Thus, the temperature may range between about −50° C. and about +300° C., and the pressure between about atmospheric and 500 lbs. p. s. i.

In vapor-liquid solvent extraction such as extractive distillation the general temperature range, though wide, is higher for the same mixtures than in liquid-liquid extraction. It is slightly above the bubble temperature of the mixture and below the boiling temperature of the solvent under the pressure maintained in the process. If a normally gaseous mixture is separated by extractive distillation, a relatively low temperature may be employed, while if a normally liquid mixture is separated by the same process a higher temperature is usually required. Subatmospheric pressure may be resorted to in order to reduce the temperature if the mixture is thermally unstable at higher temperatures. Suitable temperatures may range from above about −50° C., or the bubble temperature of the mixture (whichever is higher) up to about +350° C., at pressures from about ¼ inch of mercury up to about 500 p. s. i. or higher.

Useful solvent-to-mixture ratios may range from about ½ to 20 by volume, preferably not more than about 5.

The accompanying drawing illustrates this invention. Figure I is a general flow diagram of a solvent extraction process; Figure II is a flow diagram of an extractive distillation process; and Figure III is a flow diagram of a liquid-liquid or vapor-liquid solvent extraction process.

In regard to Figure I, a mixture to be separated is introduced in either the liquid or the vapor state through line 1 into contact zone 2 and admixed with a sulfolane introduced into the same zone through a separate line 3. This is the first step (A) in all solvent extraction processes. Suitable equipment for carrying it out may comprise either a bubble plate mixer, an impinging jet mixer, an agitation vessel, a plate column, or a packed tower.

In the contacting zone the mixture and sulfolane are caused to produce a raffinate phase and an extract phase which are separately withdrawn respectively through lines 4 and 5. This is the second step (B) of all solvent extraction processes, namely the separation of two phases produced in the contacting zone, and may be effected by distillation, settling, decantation, or centrifuging.

The third step (C) common to all solvent extraction processes comprises the recovery of sulfolane from one or both phases. In vapor-liquid extraction processes the raffinate phase may be substantially free of sulfolane and may be withdrawn directly through line 4, but if enough solvent is present to warrant its recovery the raffinate phase is passed through line 6 into the raffinate-solvent recovery system 7 to produce a solvent-free raffinate, which is withdrawn through line 8, and recovered sulfolane, which is withdrawn through line 9 and preferably joined to line 3 of sulfolane entering contact zone 2. This raffinate-solvent recovery system may comprise a crystallization chamber, distillation column or a washing column. If the solvent is washed from the raffinate phase an additional step for its recovery is necessary, such as distillation, to separate the sulfolane from the wash solvent.

The extract phase is introduced into a solvent recovery system 10, which is similar to recovery system 7. From recovery system 10 a solvent-free extract is withdrawn through line 11 and the recovered sulfolane is withdrawn through line 12 and joined to line 3 for recontact with more of the mixture in contact zone 2. Fresh sulfolane may be added to the system from time to time through line 13 as required.

Figure II illustrates an extractive distillation of the type employed for the separation of vaporizable mixtures, such as for example a gasoline distillate containing toluene. Referring to the drawing, in contact step (A) the mixture is introduced as a vapor into column 20 through line 21 where it countercurrently contacts the sulfolane solvent introduced through line 22 at a temperature slightly above the bubble point of said mixture to produce a raffinate vapor and a liquid extract phase. Column 20 may be a packed or bubble plate fractionating column and is provided at its bottom with reboiler 23 to vaporize the mixture, and at its top with vapor line 24, condenser 25 and accumulator 26 to provide a reflux of the raffinate phase to the column through line 27 and a raffinate product withdrawn through outlet line 28. The extract phase comprising the solvent and dissolved component of the mixture is withdrawn from column 20 through bottom line 29 and is introduced into stripper 30 to remove the solvent from said extract. Stripper 30 is provided with reboiler 31 at its bottom, top vapor line 32, condenser 33 and accumulator 34, reflux line 35, and outlet line 36 for finished product. Regenerated solvent is withdrawn from stripper 30 through bottom line 37 to join solvent line 22 for recontact with more of said mixture in said extractor 20. Line 38 is provided for the addition of fresh solvent to the system as required. This extractive distillation process may be carried out either adiabatically or isothermally.

Figure III illustrates a liquid-liquid extraction process of the type employed in the separation of relatively non-volatile mixtures such, for example, as lubricating oils with a water-soluble sulfolane. The mixture is introduced into extractor 40, preferably a packed column of several stages, through line 41 near its bottom, to contact countercurrently the sulfolane solvent which is introduced through line 42 near its top to produce a raffinate phase and an extract phase. The raffinate phase is withdrawn from extractor 40 through top line 43 and contains both raffinate and solvent, which latter is water-washed from the raffinate in scrubber 44. The water, which may be heated, is introduced into scrubber 44 through line 45 to produce an aqueous solvent, which is withdrawn through bottom line 46, and a raffinate product free of solvent, which is withdrawn through top line 47. The extract phase from extractor 40 is withdrawn through bottom line 48 and contains the extract and a major portion of the solvent, which latter is similarly removed by water-washing in scrubber 49. The water, which may be heated, is introduced into scrubber 49 through line 50 to produce a solvent-free extract which is withdrawn through top line 51 and the aqueous solvent is withdrawn through bottom line 52 and joined with line 46. Aqueous solvent from both scrubbers 44 and 49 is then introduced through line 53 into stripper 54 for concentration. Stripper 54 is provided at its bottom with reboiler 55 and at its top with water vapor line 56, condenser 57 and accumulator 58 to provide a water reflux through line 59 and recovered water, which may be discarded through line 60 or recirculated to scrubbers 44 and 49 through lines 61, 45 and 50. Fresh water may be added to the system from time to time through line 62 as required. Anhydrous solvent produced in stripper 54 is withdrawn through bottom line 63 to join line 42 for recontact with more of said mixture in extractor 40. Fresh solvent may be added to the system from time to time through line 64. If the mixture treated is highly viscous, its viscosity may be reduced by increasing the temperature throughout the system within the limits indicated before, or by the addition of an inert diluent, which latter must be removed from the raffinate by a further stripping step not shown.

The diagram of Figure III may be applied to the separation of normally gaseous mixtures as well as normally liquid mixtures.

The following are examples of the effectiveness of the solvents of this invention on the separation of different mixtures:

*Example I*

The following comparative tests show the usefulness of two of the selective solvents of this invention in liquid-liquid extraction of low-boiling hydrocarbon mixtures. For comparison liquid $SO_2$, one of the most selective of the commonly used solvents, is also shown.

A hydrocarbon toluene concentrate obtained from petroleum having a true boiling range between 95 and 115° C. and a toluene content of 10.9% by weight was admixed in a vessel at room temperature with an equal volume of each of the solvents shown in the table below and two liquid phases were formed. Each phase was water-washed to remove the solvent and then tested to determine the weight percent of toluene in each phase. From the resulting data was calculated the distribution ratio K for toluene, which is the weight percent of toluene in the extract phase divided by the weight percent of toluene in the raffinate phase. The results were as follows:

| Solvent used | Weight per cent of toluene | | Weight per cent recovery of toluene | Distribution ratio K |
|---|---|---|---|---|
| | Raffinate | Extract | | |
| 3-methyl sulfolane | 8.1 | 54.0 | 32.0 | 6.7 |
| 2,4-dimethyl sulfolane | 6.9 | 25.4 | 38.5 | 3.67 |
| Liquid sulfur dioxide (at 14° C.) | 21.5 | 68.5 | | 3.19 |

These single-stage liquid-liquid extractions of a toluene concentrate with different solvents show the effective selectivity or distribution ratio of the alkyl sulfolanes of this invention for the separation of toluene from non-aromatics.

*Example II*

In the following comparative tests the effect of water on the selectivity of the solvents of this invention in liquid-liquid extraction of low-boiling hydrocarbon mixtures is shown. A toluene concentrate obtained from petroleum having a true boiling range between 95 and 115° C. and a toluene content of 10.9% by weight was admixed in a vessel at room temperature with an equal volume of 3-methyl sulfolane containing water of different concentrations, as shown in the table below, and two liquid phases were formed. Each phase was water-washed to remove the solvent and then tested to determine the weight percent of toluene in each phase. From the resulting data was calculated the distribution ratio for toluene as described in the example above.

| Per cent by weight of water | Weight per cent toluene in— | | Weight per cent recovery of toluene | Distribution ratio K |
|---|---|---|---|---|
| | Raffinate | Extract | | |
| 0 | 8.1 | 54.0 | 32.0 | 6.7 |
| 5 | 8.9 | 60.2 | 27.0 | 6.83 |
| 10.9 | 9.14 | 70.0 | 15.4 | 7.65 |

These single-stage liquid-liquid extractions of toluene concentrate show the increased selectivity of an alkyl sulfolane with water for aromatics over non-aromatics in hydrocarbon mixtures.

*Example III*

A hydrocarbon mixture free from aromatics having a boiling range between 95 and 115° C. consisting essentially of 38.2% by weight of naphthenes and the remainder paraffins was contacted in a vessel at room temperature with 1.41 times its weight of 2,4-dimethyl sulfolane. Two liquid phases were produced. These phases were separated and each was washed with water to remove the sulfolane, and the two resulting phases were analyzed. The upper or raffinate phase contained 35.9% of naphthenes, and the lower or extract phase contained 43.7% by weight of naphthenes, with 41.0% of the total naphthenes having gone into the extract. This single-stage liquid-liquid extraction shows the high selectivity of an alkyl sulfolane for naphthenes over paraffins in a hydrocarbon mixture.

*Example IV*

The following comparative tests show the utility of an alkyl sulfolane in extractive distillation of lower boiling hydrocarbon mixtures. For comparison two commonly used solvents are also listed.

A mixture of toluene (B. P.=110.6° C.) and paraffins having about the same boiling range as toluene was admixed in a vessel with an equal weight of each of the solvents shown in the following table. Each mixture was then heated until the vapor above the liquid was in equilibrium with the liquid, and then samples of the vapor were separated and condensed, and tested to determine the percent of toluene in the vapor. From these data the volatility ratio of toluene to paraffin in the presence of each solvent was calculated. The volatility ratio, often called the "alpha value," is the ratio of the percent of paraffins in the vapor to the percent of paraffins in the liquid, divided by the ratio of the percent of toluene in the vapor to the percent of toluene in the liquid. In comparison the volatility ratio of toluene to paraffin in the mixture without the addition of a solvent is also shown.

| Solvent | Boiling point of solvent °C. | Weight percent toluene | | Volatility ratio |
|---|---|---|---|---|
| | | Liquid | Vapor | |
| 2,4-dimethyl sulfolane | 275 | 54.5 | 30.3 | 2.76 |
| Furfural | 163 | 65.0 | 81.4 | 2.23 |
| Phenol | 182 | 64.5 | 79.4 | 2.10 |
| None | | | | 1.32 |

*Example V*

The following comparative tests show the usefulness of alkyl sulfolanes in liquid-liquid extraction of high boiling hydrocarbon mixtures. For comparison furfural, one of the most selective commercial solvents, is also listed. A sample of Mt. Poso lubricating oil stock was contacted in a vessel with 3 times its volume of each of the solvents under the conditions shown in the following table to produce two liquid phases. Each raffinate phase was washed with hot water to remove the solvent therefrom and was then tested.

| | Original oil | 3-methyl sulfolane | 3-methyl sulfolane | 2,4-dimethyl sulfolane | Furfural |
|---|---|---|---|---|---|
| Temperature of extraction °F | | 150 | 200 | 150 | 150 |
| Weight percent recovery of raffinate | 100 | 78 | 69 | 63 | 63 |
| SUV at 100° F | 262.8 | 169.4 | 162.5 | 138.8 | 159.8 |
| SUV at 210° F | 11.35 | 10.06 | 10.05 | 2.6 | 9.74 |
| Viscosity index | −42 | −7 | +2 | +19 | +5 |
| Density 20/4 | .9521 | .9293 | .9272 | .9186 | .9208 |
| Refractive index at 20/0 | 1.532 | 1.513 | 1.51 | 1.5018 | 1.502 |
| Specific dispersion | 143 | 115 | 108 | 107 | 109 |
| Percent sulfur by weight | .70 | .58 | .57 | .48 | .49 |

Thus, the alkyl sulfolanes materially increase the removal of sulfur and products which lower the viscosity index of lubricating oils.

*Example VI*

A petroleum distillate having a boiling range of between 90 and 115° C. and containing 4.98% by weight of mercaptans calculated as amyl mercaptan was admixed at room temperature with an equal volume of 2,4-dimethyl sulfolane. Two liquid phases were produced which were separated and analyzed for mercaptans. The raffinate phase contained 1.77% by weight mercaptans and the extract phase contained 3.17% by weight mercaptans. 63.6% of the total mercaptans was contained in the extract phase, 35.5% having remained in the raffinate phase.

We claim as our invention:

1. In a solvent extraction process for separating a mixture of different organic compounds, the step comprising contacting said mixture with a hydrocarbon-substituted liquid sulfolane having from 5 to 14 carbon atoms to produce two phases, and separating said phases.

2. The process of claim 1 wherein said mixture comprises predominantly hydrocarbons.

3. The process of claim 1 wherein said mixture is an azeotrope.

4. The process of claim 1 wherein said mixture consists of organic compounds of different degrees of saturation.

5. The process of claim 1 wherein said hydrocarbon-substituted sulfolane contains from 5 to 8 carbon atoms.

6. The process of claim 1 wherein said sulfolane is 3-methyl sulfolane.

7. The process of claim 1 wherein said sulfolane is 2,3-dimethyl sulfolane.

8. In a solvent extraction process for separating a mixture of different organic compounds, the steps comprising contacting said mixture with a liquid hydrocarbon-substituted sulfolane having from 5 to 14 carbon atoms to produce two phases, separating said phases, recovering said sulfolane and returning the recovered sulfolane for further contacting it with more of said mixture.

9. In a solvent extraction process for separating a mixture of organic compounds the steps comprising contacting said mixture with a selective solvent to produce two phases and separating said phases, said selective solvent comprising between about 10% and 100% by volume of a hydrocarbon-substituted sulfolane.

10. The process of claim 9 wherein said solvent comprises more than 50% by volume of said hydrocarbon-substituted sulfolane.

11. In a solvent extraction process for separating a liquid mixture of organic compounds the steps comprising contacting said mixture with a hydrocarbon-substituted sulfolane having from 5 to 14 carbon atoms at a temperature above the melting temperature of said sulfolane and below the boiling temperature of the mixture and said sulfolane to produce two phases, separating said phases, and recovering said sulfolane from at least one of said phases.

12. The process of claim 11 wherein said mixture is a petroleum fraction and said sulfolane is 3,4-dimethyl sulfolane.

13. A process for separating a mixture of hydrocarbons of different degrees of saturation comprising contacting said mixture with a hydrocarbon-substituted sulfolane having from 5 to 14 carbon atoms to produce a raffinate phase and an extract phase, separating said phases and recovering said sulfolane to produce a raffinate and an extract, said raffinate having a higher concentration of more saturated hydrocarbons than said mixture and said extract having a higher concentration of less saturated hydrocarbons than said mixture.

14. The process of claim 13 wherein said hydrocarbon mixture is a toluene concentrate obtained from petroleum.

15. The process of claim 13 wherein said hydrocarbon mixture is a petroleum lubricating oil.

16. In a solvent extraction process for separating a mixture of hydrocarbons of different degrees of saturation the steps comprising contacting said mixture with a selective solvent, said solvent containing a hydrocarbon-substituted sulfolane having from 5 to 8 carbon atoms to produce a raffinate phase and an extract phase, separating said phases, washing at least one of said phases with water to produce an oil substantially free from solvent and aqueous solvent solution, separating said aqueous solvent solution from said oil, and separating said solvent from the water in said aqueous solution.

17. In an extractive distillation process for separating a mixture of vaporizable organic compounds the steps comprising contacting said mixture in the vapor state with a liquid hydrocarbon-substituted sulfolane having from 5 to 14 carbon atoms at a temperature above the bubble temperature of said mixture and below the boiling temperature of said sulfolane to produce two phases, and separating said phases.

18. The process of claim 17 wherein said mixture is a toluene concentrate obtained by distillation of petroleum.

19. In an extractive distillation process for dehydrating a vaporizable aqueous organic mixture, the steps comprising contacting said mixture in the vapor state with a liquid hydrocarbon-substituted sulfolane having from 5 to 14 carbon atoms at a temperature above the bubble temperature of said mixture and below the boiling temperature of said sulfolane to produce two phases, and separating said phases.

20. In a solvent extraction process for desulfurizing an organic petroleum oil, the steps comprising contacting said oil with a liquid hydrocarbon-substituted sulfolane having from 5 to 14 carbon atoms to produce two phases, and separating said phases.

21. In a solvent extraction process for separating a gaseous mixture of different organic compounds, the steps comprising contacting said mixture with a liquid hydrocarbon-substituted sulfolane having from 5 to 14 carbon atoms at a temperature above the bubble temperature of said mixture and below the boiling point of said sulfolane to produce two phases, and separating said phases.

22. The process of claim 21 wherein said mixture contains hydrocarbons having 4 carbon atoms per molecule.

23. In a solvent extraction process for separating a vaporizable mixture of organic compounds, the steps comprising contacting said mixture with a solvent comprising a hydrocarbon-substituted liquid sulfolane having from 5 to 14 carbon atoms to produce two phases, separating said phases and recovering said solvent from at least one of said phases by fractional distillation.

24. In a solvent extraction process for separating a mixture of hydrocarbons comprising aromatics and non-aromatics, the steps comprising contacting said mixture with a solvent comprising a hydrocarbon-substituted liquid sulfolane having from 5 to 14 carbon atoms to produce an extract phase and a raffinate phase, separating said phases and recovering said solvent to produce a raffinate and an extract, said raffinate containing said non-aromatics and said extract containing said aromatics.

25. In a solvent extraction process for separating a mixture of hydrocarbons comprising di-olefins and more saturated hydrocarbons, the steps comprising contacting said mixture with a solvent comprising a hydrocarbon-substituted liquid sulfolane having from 5 to 14 carbon atoms to produce an extract phase and a raffinate phase, separating said phases and recovering said solvent to produce a raffinate and an extract, said raffinate containing said more saturated hydrocarbons and said extract containing said di-olefins.

GINO J. PIEROTTI.
CLARENCE L. DUNN.